No. 659,792. Patented Oct. 16, 1900.
G. H. DENNY.
BALING PRESS.
(Application filed June 19, 1900.)
(No Model.) 6 Sheets—Sheet 2.
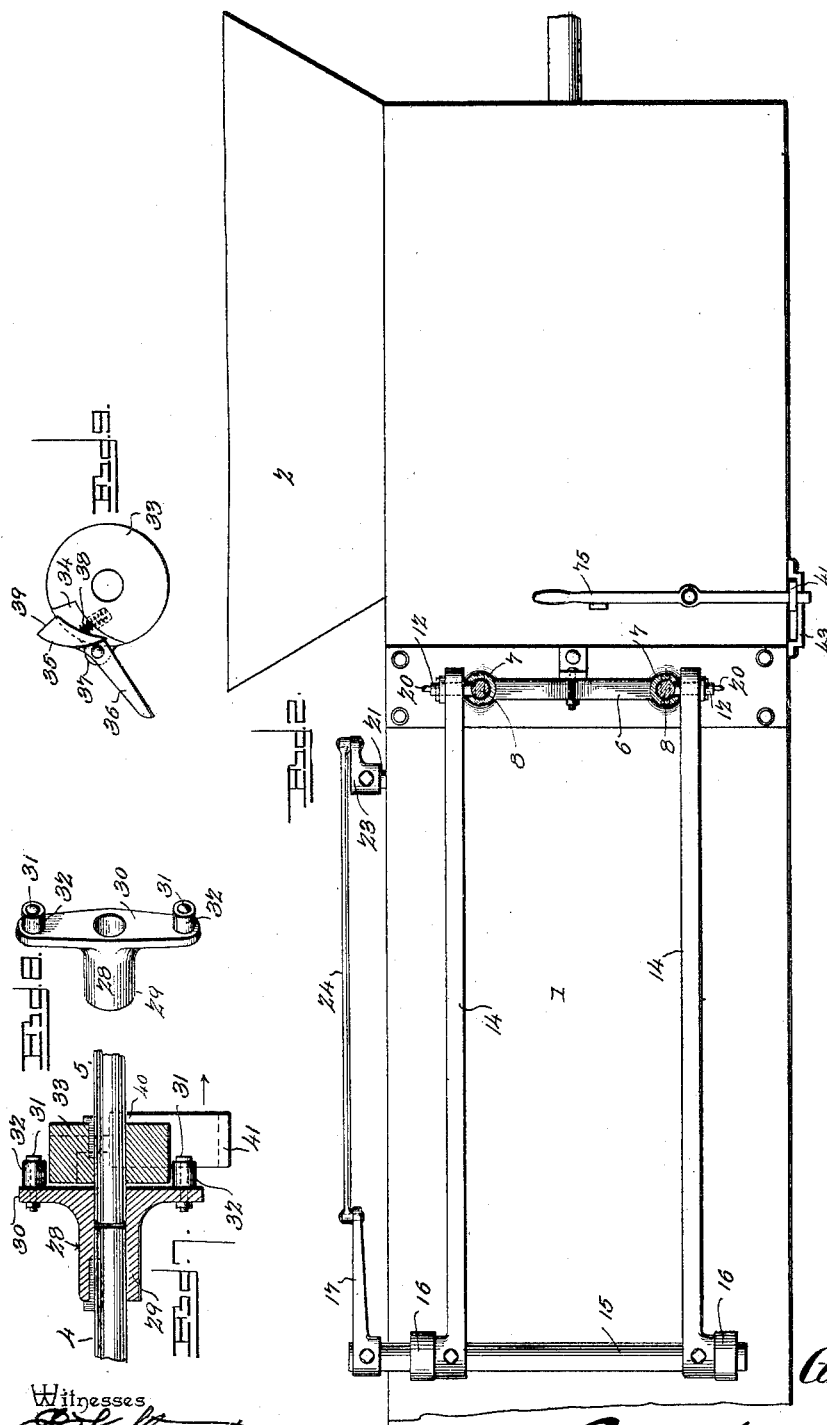

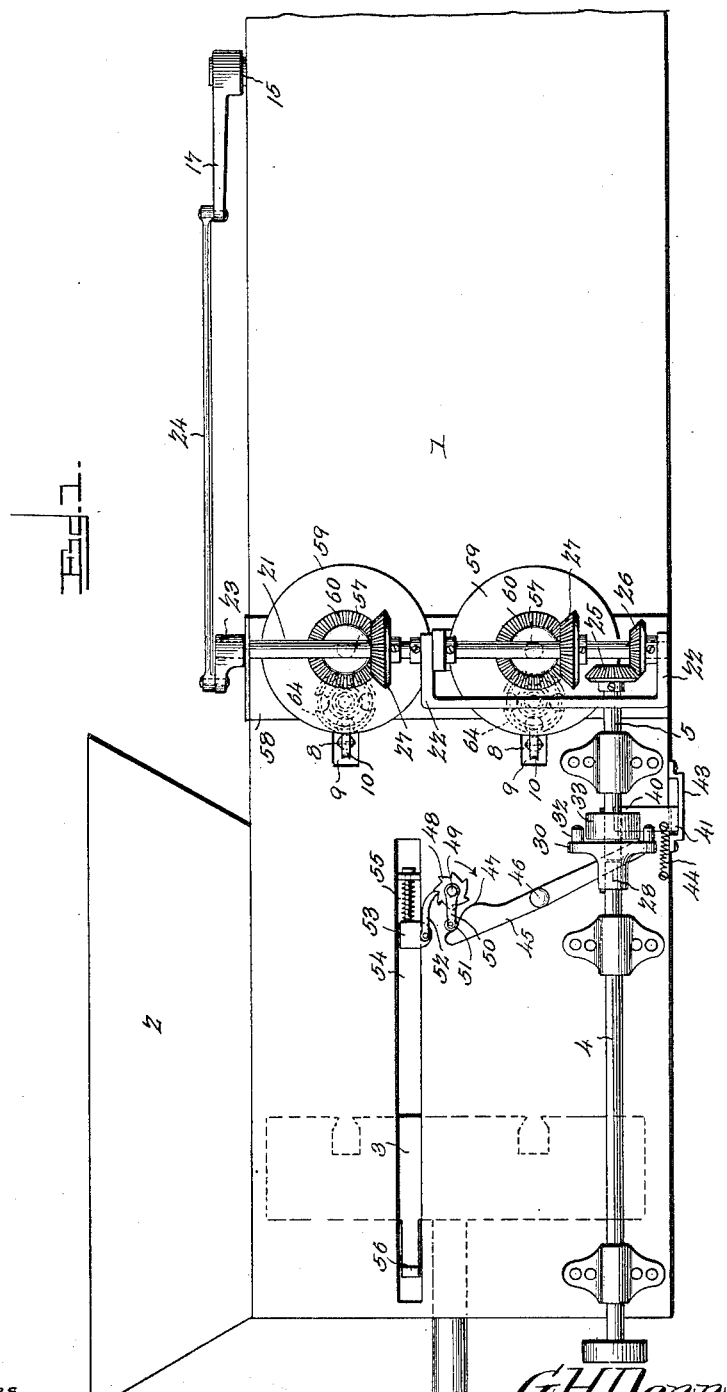

No. 659,792. Patented Oct. 16, 1900.
G. H. DENNY.
BALING PRESS.
(Application filed June 19, 1900.)
(No Model.) 6 Sheets—Sheet 3.
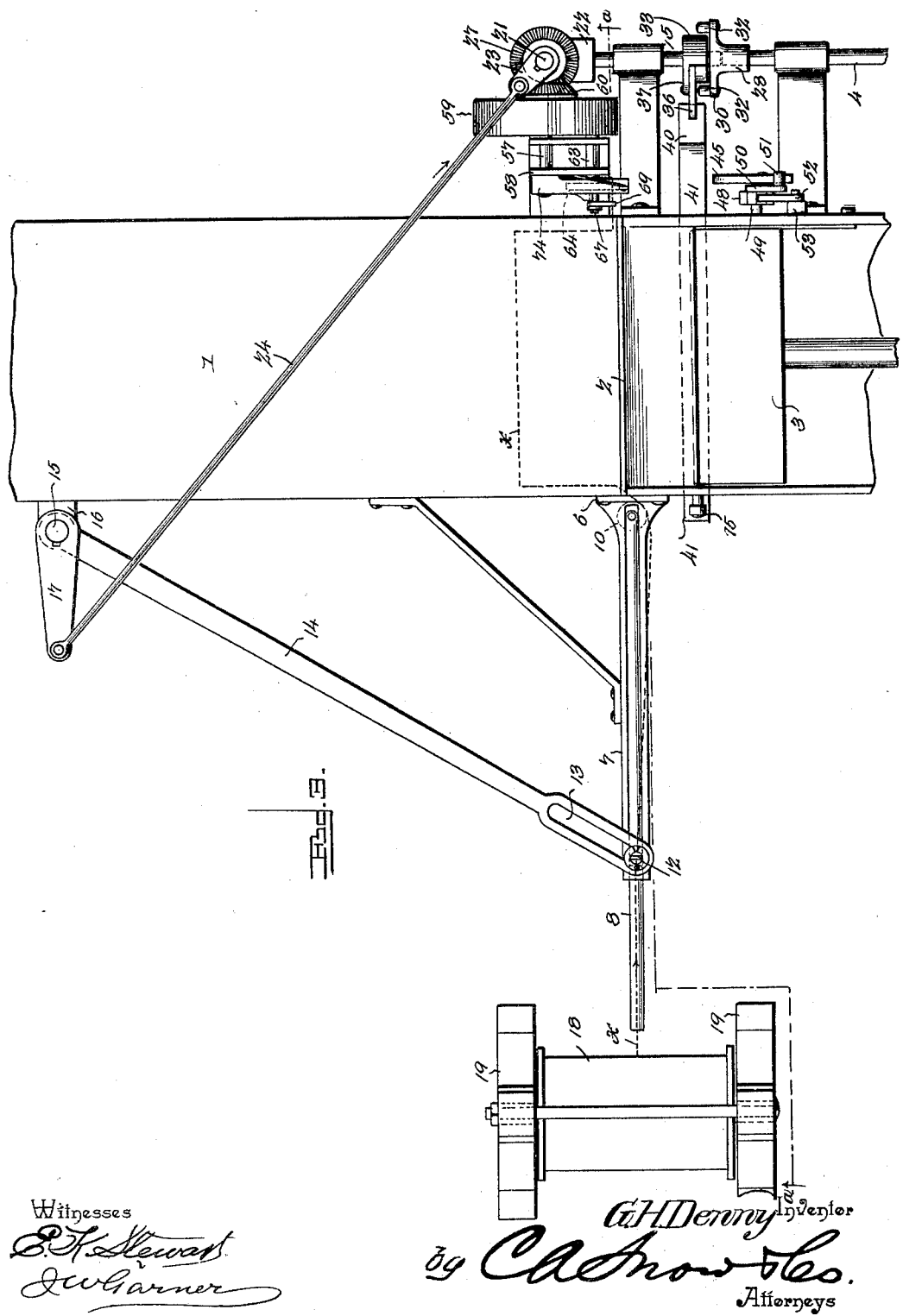

No. 659,792. Patented Oct. 16, 1900.
G. H. DENNY.
BALING PRESS.
(Application filed June 19, 1900.)
(No Model.) 6 Sheets—Sheet 4.
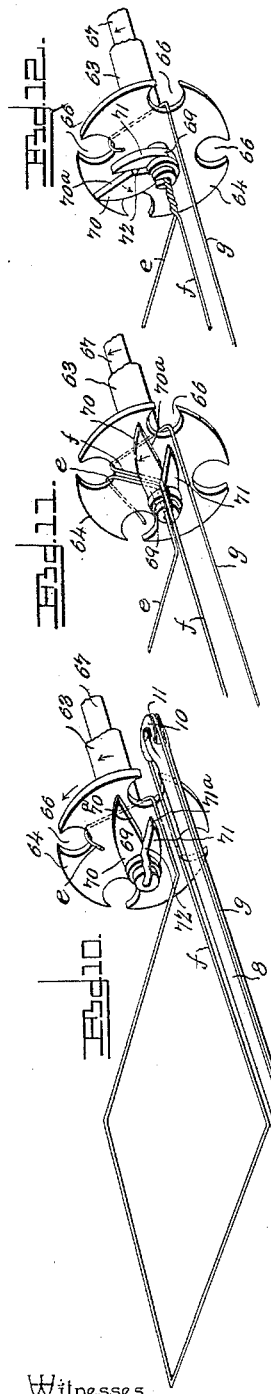
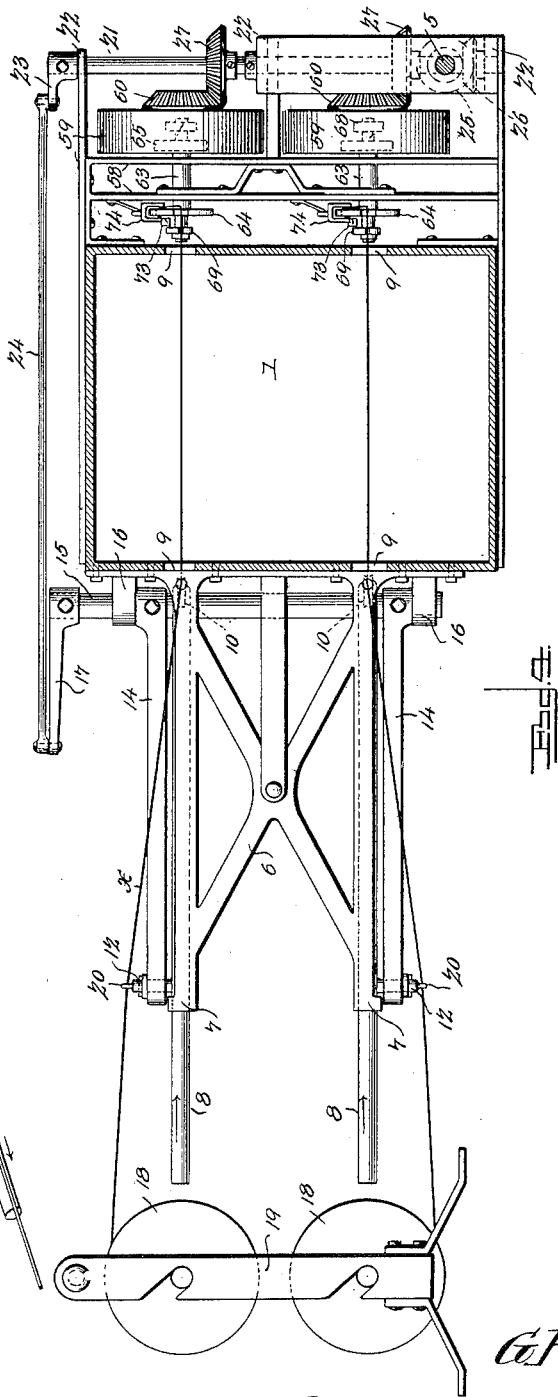
Witnesses
G. H. Denny
Inventor

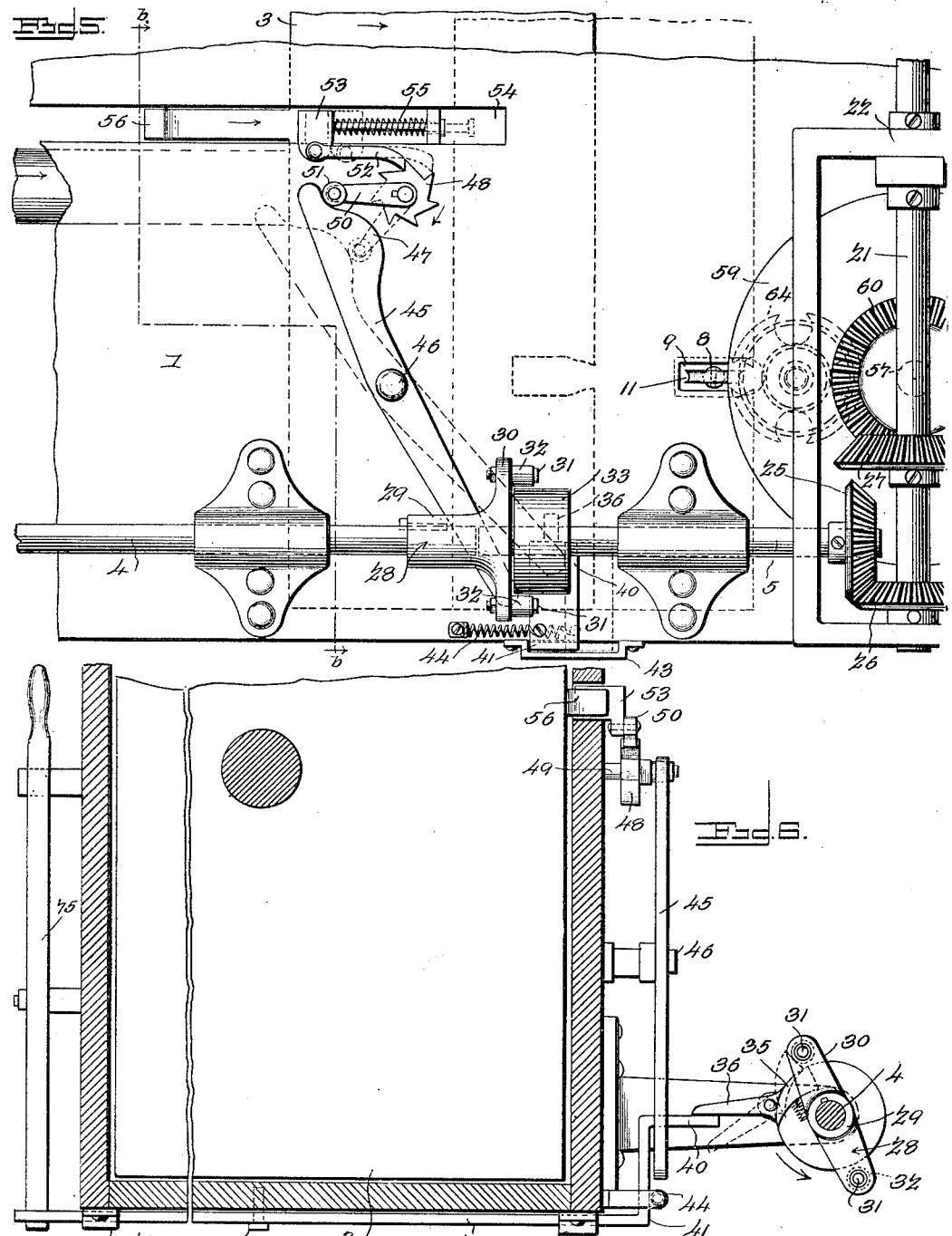

No. 659,792. Patented Oct. 16, 1900.
G. H. DENNY.
BALING PRESS.
(Application filed June 19, 1900.)
(No Model.) 6 Sheets—Sheet 6.
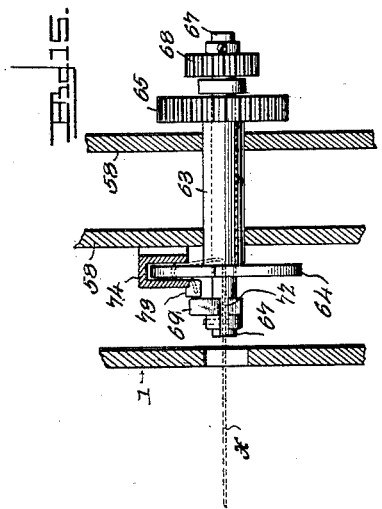
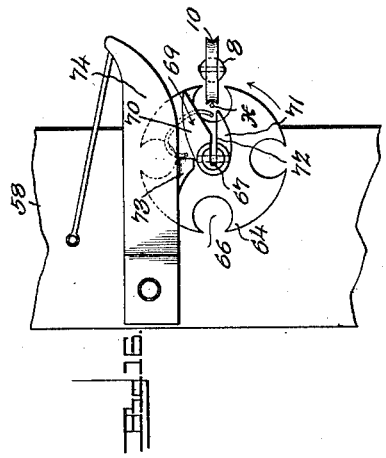
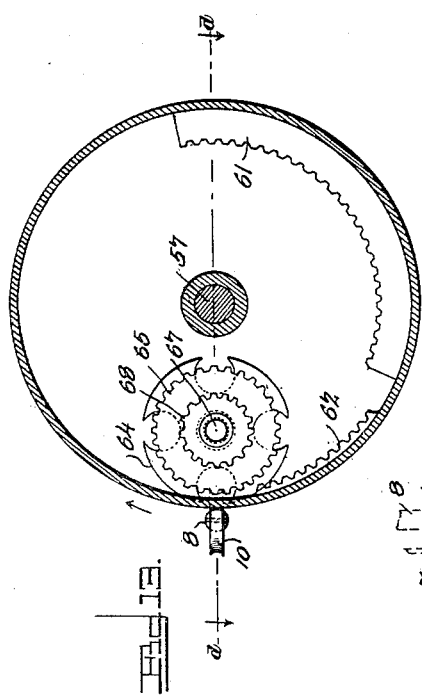
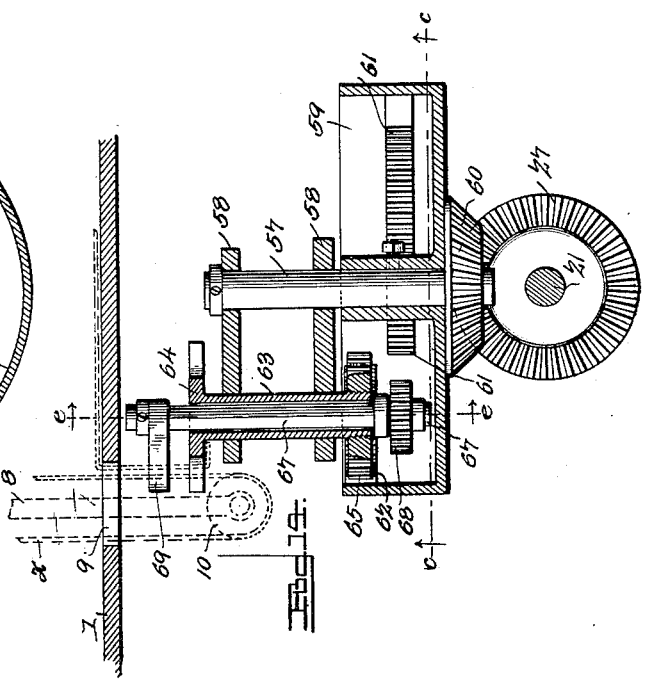
Witnesses
E. F. Stewart.
J. W. Garner
G. H. Denny Inventor
by C. A. Snow & Co.
Attorneys
THE NORRIS PETERS CO., PHOTO-LITHO., WASHINGTON, D. C.

UNITED STATES PATENT OFFICE.

GEORGE HENRY DENNY, OF CHICKASHA, INDIAN TERRITORY.

BALING-PRESS.

SPECIFICATION forming part of Letters Patent No. 659,792, dated October 16, 1900.

Application filed June 19, 1900. Serial No. 20,865. (No model.)

*To all whom it may concern:*

Be it known that I, GEORGE HENRY DENNY, a citizen of the United States, residing at Chickasha, in the Chickasaw Nation, Indian Territory, have invented a new and useful Baling-Press, of which the following is a specification.

My invention is an improved baling-press, the object of my invention being to provide means for automatically disposing the binding-wires around the bales as the same are formed, cutting the wires, and twisting the ends of the wire bands together to secure the same on the bales.
My invention consists in the peculiar construction and combination of devices hereinafter fully set forth, and pointed out in the claims.

In the accompanying drawings, Figure 1 is a side elevation of a portion of a baling-press provided with my improved automatically-operating wire binding, twisting, and cutting mechanisms. Fig. 2 is a similar view of the reverse side thereof. Fig. 3 is a top plan view of the same. Fig. 4 is a vertical sectional view taken on the line *a a* of Fig. 3. Fig. 5 is a detail elevation, on a larger scale, of a portion of the mechanism shown in Fig. 1. Fig. 6 is a detail vertical transverse sectional view taken on the line *b b* of Fig. 5. Fig. 7 is a detail sectional view of a portion of the power-shaft and the clutch member for connecting the sections thereof together and disconnecting said sections. Fig. 8 is a detail perspective view of one of the clutch members. Fig. 9 is a side elevation, in detail, of the other clutch member. Figs. 10, 11, and 12 are diagrammatic perspective views of the wire twisting and cutting mechanisms, illustrating the operation thereof in disposing a wire band around a bale, cutting the same from the wire, and twisting the ends of the band together. Fig. 13 is a detail sectional view of a portion of the gears for actuating the wire cutting and twisting devices, taken on the line *c c* of Fig. 14. Fig. 14 is a horizontal sectional view taken on the line *d d* of Fig. 13. Fig. 15 is a detail vertical sectional view taken on the line *e e* of Fig. 14.
Fig. 16 is a detail elevation of one of the wire cutting and twisting devices.

The baling-press *per se* is not of my invention, and comprises the press-box 1, having the hopper 2, the reciprocating follower 3, and any suitable mechanism, as a horse-power mechanism or the like, for operating the follower. The power-shaft 4 is connected to the horse-power or other means for actuating the follower, and when the press is in operation the said power-shaft 4 continually rotates. A shaft-section 5, which is disposed in line with the power-shaft 4 and one end of which closely approaches one end of the power-shaft, is normally idle. Said shaft-section is only rotated for a brief space of time at the completion of the formation of each bale in the press-box and when thus rotated actuates the devices for cutting the wires and twisting the ends of the wire band together. In connection with the said wire cutting and twisting devices I have combined wire-carrying arms or needles, which operate to dispose the wires around the bales as the latter are formed in the press-box, and I will first describe the said wire-carrying arms or needles and the means which I have invented for automatically operating the same.

From one side of the press-box 1 projects a guide-frame 6, in the upper and lower sides of which are guideways 7, in which wire-carrying arms or needles 8 are disposed and adapted to reciprocate. The said needles are adapted to move across the press-box at a point coincident with the inner limit of the stroke of the follower through openings 9 in the sides of the press-box, and each of the said needles or arms is provided at its inner end with a wire-carrying revoluble sheave 10, peripherally grooved, as at 11, for the reception and retention of a wire therein. From the upper and lower sides of the respective arms or needles 8, at points a suitable distance from the outer ends thereof, project vertical studs or pins 12, which operate in slots 13 in the outer ends of rock-levers 14. The inner ends of the said rock-levers are secured to a vertically-disposed rock-shaft 15, which is mounted in suitable bearings 16 on one side of the press-box, and to the upper end of the said rock-shaft is secured a crank-arm 17. It will be understood that by rocking the shaft 15 the levers 14 may be caused to move the wire-carrying arms or needles 8 longitudinally back and forth across and through the press-box.

Wire-reels 18 are mounted in a rack 19, disposed on one side of the press at a suitable distance from the press-box and in line with the guide-frame 6, and the wires from the said wire-reels are passed through guide-eyes 20 on the ends of the studs or pins 12, the wires, which are designated by the letter $x$, being engaged by the sheaves 10, as hereinbefore stated.

A vertical shaft 21 is disposed on the side of the press-box opposite the rock-shaft 15 and is journaled in suitable bearings, as at 22. A crank-arm 23 is secured to the upper end of said shaft 21, and said crank-arm is connected to the crank-arm 17 of rock-shaft 15 by a pitman or rod 24. Hence it will be understood that the shaft 21 being rotated the shaft 15 will be rocked and the wire-carrier arms or needles 8 caused to operate in the manner hereinbefore described. The shaft-section 5, which is normally idle, is provided with a miter gear-wheel 25, fast thereon, which engages a similar gear 26, fast on the vertical shaft 21. Also secured to said shaft 21 are miter-gears 27, which correspond in number with the number of bands of wires that the press and wire binding, tying, and cutting mechanisms are adapted to place around each bale. In the drawings herewith the press is shown as provided with means for placing two tie wires or bands around each bale. In addition to its function of operating the wire-carrying arms or needles the shaft 21 imparts power to the wire cutting and twisting mechanisms presently described. I will now describe the means which I have invented for automatically communicating power momentarily to the shafts 5 21 at the completion of the formation of each bale in order to operate the wire cutting and twisting mechanisms.

A clutch member 28 is keyed to the inner end of the power-shaft 4. The said clutch member comprises a cylindrical head 29, having radial arms 30 projecting from opposite sides thereof. A stop pin or stud 31 projects from the face of each arm 30, and preferably an antifriction-roller 32 is revoluble on each stop pin or stud. A clutch member 33 is keyed to the end of the shaft-section 5, which is proximate to the inner end of the power-shaft. Said clutch member 33 is cylindrical in shape and is provided in one side with a re-entrant sector-shaped recess 34, which is adapted to be filled by a sector-shaped stop 35, carried by a trip-lever 36, which is fulcrumed to an ear 37, that projects from one side of the cylindrical clutch member 33. A spring 38 tends to normally turn the trip-lever 36 to the position shown in Fig. 9 and in dotted lines in Fig. 6 to project the face or shoulder 39 of the sector-shaped stop 35 beyond the periphery of the clutch member 33. Normally the trip-lever 36 is engaged by the arm 40 of a detent-lever 41, which is disposed transversely under the press-box, fulcrumed, as at 42, and travels in guides 43. A spring 44, which is attached to the press-box and to the detent-lever, maintains the latter normally in the position shown in Figs. 5 and 6 in engagement with the trip-lever 36. It will be understood that when the trip-lever is thus engaged the outer side of the sector-shaped stop 35 is within the radius of the cylindrical clutch member 33 and out of the path of the studs 31 of clutch member 28, so that the power-shaft 40 rotates without communicating rotary motion to the shafts 5 and 21. A lever 45, which is fulcrumed on one side of the press-box, as at 46, at its lower end, engages the arm 40 of detent-lever 41. The said lever 45 is provided near its upper end on one side with a cam 47. A ratchet-wheel 48 is mounted on a stub-shaft 49, and fast with the said ratchet-wheel is a crank-arm 50, which carries an antifriction-roller 51 at its outer end, that is adapted to engage the cam 47 when the said ratchet-wheel is rotated, and thereby partly turn the said lever 45 on its fulcrum 46. An operating-pawl 52 engages the upper side of the ratchet-wheel 48. Said pawl is carried by a reciprocating block 53, which travels in a horizontally-disposed guide-slot 54 in the side of the press-box. A spring 55 bears against one side of the block 53 and is adapted to move the latter in one direction. The follower 3 is provided with a tappet 56, which as the follower moves forward engages the block 53 just before the completion of the forward stroke of the follower and moves said block a sufficient distance to cause the ratchet-wheel to move through a space equal to the distance between two of its teeth. In practice the number of teeth with which the ratchet-wheel 48 is provided is equal to the desired number of layers of material in each bale, hence predetermining the number of layers in each bale and therefore predetermining the size of the bales. At each forward compressing stroke of the follower the ratchet-wheel is partly rotated by the pawl, and thereby a step-by-step movement is imparted to the ratchet-wheel, and the latter makes one complete rotation while a bale is being formed in the press-box, and hence near the completion of each rotation of the ratchet-wheel the arm 50, which is turned thereby by engagement with the cam 47 of lever 45, causes said lever to be partly turned on its fulcrum 46 and to move the detent-lever 41 so that the arm 40 thereof clears the trip-lever 36, whereupon said trip-lever, by the action of spring 38, is caused to assume the position indicated in Fig. 9 and in dotted lines in Fig. 6 and interpose the sector-shaped stop 35 in the path of the studs 31, carried by the constantly-rotating shaft 4, and hence imparting rotary motion to the shaft-section 5 and the vertical shaft 21, which is geared thereto. As the arm 50 clears the cam 47, the lever 45 reassumes its normal position, (shown in dotted lines in Fig. 5,) the detent-lever 41 being returned to its normal position (shown in the same figure) by the spring 44, thereby interposing the arm 40 thereof again in the path of the trip-lever 36, arresting said trip-lever and returning the sector-shaped stop 35 to a position within the radius of the cylindrical clutch member 33, and hence by unobstructing the path of the studs 31 disconnecting the shaft-section 5 from the power-shaft and arresting the rotation of said shaft-section 5 and the vertical shaft 21. It will be understood from the foregoing description that the wire-carrying arms or needles are actuated by the rotation of the shaft 21. The wire cutting and twisting mechanisms are also actuated by the rotation of said shaft 21, and I will now describe the said wire cutting and twisting mechanisms.

A pair of stub-shafts 57 are mounted in suitable bearings 58 and disposed a slight distance beyond the side of the press-box, between the latter and the shaft 21. On each shaft 57 is keyed a master-wheel 59 and a miter gear-wheel 60. The latter engage the miter-gears 27 on the shaft 21. Each master-wheel is provided with an internal geared section 61 and a gear-section 62 in advance thereof, said section 62 being of much less extent than section 61. Tubular shafts 63, which correspond in number with the shafts 57, are also journaled in the bearings 58 and disposed in the same horizontal planes with the shaft 57, and each tubular shaft is provided at its inner end with a wire-disk 64 and at its outer end with a spur gear-wheel 65. The said spur gear-wheels are adapted to be engaged and partly rotated by the gear-section 62 of the master-wheel at each rotation of the latter. Each of the wire-disks 64 is provided with openings 66, extending to the periphery thereof, there being four of the said openings to each disk, spaced regularly apart, and the sections 62 of the master-wheels are of such extent that the same at each rotation of the master-wheel cause the wire-disks carried by the tubular shaft 63 to move through one-fourth of a circle, a space equal to the distance from center to center of two of the openings 66 to 66. The latter, as the wire-disks thus partially rotate, are successively disposed in line with and opposite the openings 9 in the sides of the press-box and register with said openings 9, so that as the wire-carrying arms or needles 8 move outward and traverse the press-box from side to side the outer ends of the said needles or arms carrying the sheaves 10 may pass through said registering openings 66 to 66, and thereby dispose one side of the wire bights or loops carried by said sheaves at right angles to the wire-disks 64 and within said registering opening 66 thereof, as shown clearly in Figs. 10 and 16 and indicated in dotted lines in Figs. 1, 5, 13, and 14. In each tubular shaft 63 is a revoluble shaft 67.

Each shaft 67 has keyed near its outer end a spur-pinion 68, adapted to be engaged and rotated by the gear-section 61 of one of the master-wheels 59, and fast on the inner end of each shaft 67 is a wire-twister 69. Each wire-twister 69 comprises a pair of jaws 70 71, disposed in different planes, the jaws 71 projecting beyond the outer side of the jaws 70, and said jaws 70 71 having angularly-disposed coacting edges $70^a$ $71^a$, respectively, which conduct to wire-receiving openings 72, formed between the said jaws and extending slightly past the centers of the shafts 67.

The operation of my invention is as follows: Before starting the press in operation the wires are passed through the openings 9 by the arms or needles 8 and engaged by the wire-disks 64, as at $e$, Fig. 10. The wire-carrier needles or arms will then be withdrawn to dispose the wires transversely across the press-box, as shown in Fig. 4. The press being then set in motion to reciprocate the follower and rotate the power-shaft 4, the lever 45, ratchet-wheel 48, detent-lever 41, and trip-lever 36 being in their initial normal positions, (shown in Figs. 5 and 6,) the successive layers of the bale in process of being formed, pressed by the follower, move outward in the press-box against the wires $x$, and hence the wires as the bale is formed become disposed around three sides thereof, as will be understood. The ratchet-wheel 48 being, by the means hereinbefore described, rotated by a step-by-step movement as the successive layers of the bale are compressed, the said ratchet-wheel, as it completes its rotation when the desired number of layers have been compressed in the bales by the engagement of the arm 50 with the cam 47 of lever 45, moves the said lever so as to cause the shaft-section 5 to become connected to and rotated simultaneously with the shaft 4, by the means hereinbefore described, thereby momentarily communicating rotary motion to the shaft 21, the initial movement of which operates the wire-carrying arms or needles 8, so that the latter carry a bight of wire across the press-box in rear of the bale just formed, as shown in Fig. 10, the side $f$ of the bight being disposed in one of the openings 66 of the wire-disks 64. The mechanism is so timed that at this instant the section 62 of master-wheel 59 engages the gear 65 of tubular shaft 63 and imparts a partial rotation thereto, causing the wire-disk 64 to move through one-fourth of a revolution, thereby disposing the wires $e f$ between the coacting edges $70^a$ $71^a$ of the wire-twisting jaws 70 71 and in the openings 72 between said jaws, as shown in Fig. 11, the wire-carrying arms or needles by the continued rotation of the vertical shaft 21 and the connections hereinbefore described being withdrawn from the press-box, thereby disposing the side $g$ of the wire bight in one of the openings 66. As each wire-disk assumes this position and the wires are thus disposed the section-gear 62 of master-wheel 59 by the rotation of the latter moves out of engagement with the gear 65, and hence the rotation of the wire-disk is arrested, and immediately thereafter the gear-section 61 of the master-wheel 59 comes into engagement with the pinion 68 of shaft 67 and imparts rotary motion to said shaft and to the wire-twisting jaws 70 71, the initial movement of the said shaft 67 causing the said jaw 71 by coaction with a shearing-shoulder 73, carried by an arm 74 on the inner bearing-plate 58, to cut the wires, and by the continued rotation of said shaft 67, which makes a number of revolutions predetermined by the proportions of gear-section 51 and pinion 68, to twist the ends of the wire band formed around the bale together, as shown in Fig. 12, thereby completing the operation of wiring the bale. I have described only the operation of one of the wire cutting and twisting mechanisms; but as the same are duplicates it will be understood that they operate simultaneously and alike. Immediately upon the completion of the operations of cutting and twisting the wires the arm 50 by clearing the cam 47, as hereinbefore described, disconnects the shaft-section 5 from the power-shaft 4, thereby arresting the rotation of said shaft-section 5, shaft 21, and the wire carrying, cutting, and twisting mechanisms until another bale has been formed. A hand-lever 75 is provided and adapted to actuate the detent-lever 41 to enable the shaft-section 5 to become connected to or disconnected from the power-shaft 14 when starting or stopping the baling-press. It will be observed that the face of the follower is provided with recesses 76 to receive the wire-carrying arms or needles and enable the follower to clear the same when in operation.

Having thus described my invention, I claim—

1. In a baling-press, the combination with a press-box, and means to form a bale therein, of a reciprocatory wire-carrier arm or needle adapted to operate transversely of the press-box, a revoluble wire-disk having peripheral openings adapted to be successively disposed in the path of the wire-carrier arm, and twisting devices revoluble independently of said wire-disk and comprising a pair of jaws, of unequal lengths, one projecting beyond the outer end of the other, said jaws having angularly-disposed coacting edges, conducting to a wire-receiving opening, substantially as described.

2. In a baling-press, the combination with a press-box and means to form a bale therein, of a reciprocatory wire-carrier arm or needle adapted to operate transversely of the press-box, a revoluble wire-disk having peripheral openings adapted to be successively disposed in the path of the wire-carrier arm, twisting devices, revoluble independently of said wire-disk, and comprising a pair of jaws of unequal lengths, one projecting beyond the outer end of the other, said jaws having angularly-disposed coacting edges conducting to a wire-receiving opening formed between them, and a stationary shearing-shoulder, said shoulder and one of said jaws coacting to cut the wires, substantially as described.

3. The combination of a baling-press and means to pass a wire around a bale therein and form a loop in the wire on one side of the bale, a revoluble wire-disk having peripheral openings adapted for the attachment thereto of the sides of said loop and an independently-revoluble wire-twister comprising a pair of jaws having angularly-disposed coacting edges conducting to a wire-receiving opening formed between them and extending to the axis of the disk, and a stationary shearing-shoulder, said shoulder and one of said jaws coacting to cut the wires on the initial movement of said independently-revoluble twisting device, substantially as described.

4. In a baling-press, the combination with a press-box and means to form a bale therein, of a reciprocatory wire-carrier arm adapted on one movement in one direction to dispose a bight of wire transversely across the press-box, a revoluble disk disposed on one side of the press-box and having peripheral openings successively disposed in the path of said wire-carrier arm and adapted to engage one side of the wire bight, and independently-revoluble twisting devices having a jaw adapted to sweep past said openings, engage the wires, draw the same to the axis of the disk and subsequently twist the wires, substantially as described.

5. In a baling-press, the combination with a press-box and means to form a bale therein, of a reciprocatory wire-carrier arm adapted on one movement in one direction to dispose a bight of wire transversely across the press-box, a revoluble disk disposed on one side of the press-box and having peripheral openings, means to rotate said disk by a step-by-step movement and dispose the said openings successively in the path of the wire-carrier arm, an independently-revoluble jaw to sweep past said openings, engage the wires, draw the same to the axis of the disk, means to rotate said jaw and a shearing-shoulder, the latter and said jaw coacting to cut the wires, and means to twist the wires after they have been thus cut, substantially as described.

6. In a baling-press, the combination with a press-box and means to form a bale therein, of a reciprocatory wire-carrier arm adapted on one movement in one direction to dispose a bight of wire transversely across the press-box, a revoluble disk disposed on one side of the press-box and having peripheral openings adapted to be successively disposed in the path of the wire-carrier arm, said disk having a tubular shaft provided with a gear-wheel, a shaft in said tubular shaft, having a wire-twister device at its inner end, and a pinion at its outer end, said wire-twisting device comprising a pair of jaws of unequal lengths, one projecting beyond the outer end of the other, said jaws having angularly-disposed coacting edges conducting to a wire-receiving opening formed between them, and one of said jaws adapted to sweep past the peripheral opening in said disk, for the purpose set forth, and a master-wheel having gear-sections adapted to successively engage the said gears of said tubular shaft and the said pinion of said wire-twister shaft, substantially as described.

7. In a baling-press, the combination of a press-box and means to form a bale therein, reciprocatory wire-carrier arms, independently-revoluble wire cutting and twisting devices, a master-wheel geared thereto, an intermittently-revoluble shaft geared to said master-wheel, connections between said intermittently-revoluble shaft and said rock-shaft to actuate the latter and thereby operate the wire-carrier arms, a continuously-revoluble power-shaft, a clutch mechanism to lock said intermittently-revoluble shaft to said continuously-revoluble power-shaft, a lever to operate said clutch mechanism, and a step-by-step mechanism, actuated by the press-follower, to operate said lever, for the purpose set forth, substantially as described.

8. In a baling-press, the combination with a press-box and means to form a bale therein, reciprocating wire-carrier arms, operating transversely through the press-box, a rock-shaft and connections to actuate said wire-carrier arms, means to actuate said rock-shaft, independently-revoluble wire twisting and cutting devices, a master-wheel geared thereto, an intermittently-revoluble shaft, power connections between the same and the master-wheel, a continuously-revoluble power-shaft, a clutch mechanism to lock said intermittently-revoluble shaft to said continuously-revoluble shaft, a lever to operate said clutch, and a step-by-step mechanism, actuated by the press-follower, to operate said lever, for the purpose set forth, substantially as described.

9. In a baling-press, the combination with a press-box and means to form a bale therein, reciprocating wire-carrier arms, operating transversely through the press-box, a rock-shaft and connections to actuate said wire-carrier arms, independently-revoluble wire twisting and cutting devices, a master-wheel geared thereto, a shaft geared to said master-wheel and having a crank, a crank on said rock-shaft, a pitman connecting said cranks, an intermittently-revoluble shaft geared to said crank-shaft, a continuously-revoluble power-shaft, a clutch mechanism to lock said intermittently-revoluble shaft to said continuously-revoluble shaft, a lever to operate said clutch, and a step-by-step mechanism, actuated by the press-follower, to operate said lever, for the purpose set forth, substantially as described.

10. In a baling-press, the combination with a press-box, a reciprocating follower, wire-carrier devices, wire cutting and twisting devices, of a continuously-revoluble power-shaft, an intermittently-revoluble shaft, the latter actuating said wire carrier, cutting and twisting devices, a clutch member on the intermittently-revoluble shaft, said clutch member having a trip-lever, a clutch member on the continuously-revoluble power-shaft having a revoluble element in the path of which said trip-lever is disposed, a shifting lever adapted to be disposed in the path of said trip-lever to arrest the rotation of the intermittently-revoluble shaft and withdraw said trip-lever from the path of the revoluble clutch member of the power-shaft, a spring to move said shifting lever in one direction, a lever to move said shifting lever in the reverse direction and a step-by-step mechanism actuated by the follower to operate said lever, for the purpose set forth, substantially as described.

In testimony that I claim the foregoing as my own I have hereto affixed my signature in the presence of two witnesses.

GEORGE HENRY DENNY.

Witnesses:
 EFFIE BAKER,
 KATE SCOFFERN.